UNITED STATES PATENT OFFICE.

LOUIS LANSZWEERT, OF SAN FRANCISCO, CALIFORNIA.

IMPROVED MATCH-COMPOUND.

Specification forming part of Letters Patent No. 53,454, dated March 27, 1866.

*To all whom it may concern:*

Be it known that I, LOUIS LANSZWEERT, of San Francisco, in the county of San Francisco and State of California, have invented a new and Improved Match Compound; and I do hereby declare that the following is a full, clear, and exact description thereof, which will enable others skilled in the art to fully understand and make use of the same.

This invention relates to a match compound similar to that on which Letters Patent have been granted to me October 10, 1865, and which is to be used on a friction-surface expressly prepared for the purpose, so that all danger of a spontaneous ignition of the matches is avoided.

This new compound is made of chlorate of potash, hyposulphate of lead, glass or silex, gum or cement, and bichromate of potassa; and these ingredients are mixed together in about the following proportion: Chlorate of potash, thirty-five parts; hyposulphate of lead, fifteen parts; glass or silex, four parts; gum or cement, four parts; bichromate of potash, ten parts.

The gum or cement used in this compound is made by preparing in a water-bath white glue and nitrate of lead, to which is added a solution of benzoin in alcohol.

The proportion in which these ingredients are mixed together is about as follows: White glue, three pounds; water, two pounds; nitrate of lead, one pound; alcohol, one pound; gum-benzoin, ten grains.

The glue is first dissolved in one part of water, and to it is added a solution of nitrate of lead in the other part, and while the mixture is still lukewarm the solution of benzoin in alcohol is added. The cement or gum thus obtained is mixed with chlorate of potash, hyposulphate of lead, glass or silex, and bichromate of potassa, in about the proportion above specified, and in order to give to the mixture the consistency of thick cream, some water may be added, thus forming a paste capable of adhering firmly to the sticks and form a head of the requisite size.

The sticks are made of wood in any desirable form or size, and they are saturated or coated with paraffine, stearine, or any other suitable substance, such as commonly used for this purpose in the manufacture of matches.

In order to preserve the head of the matches against the influence of moisture, I expose the matches prepared as above stated to the influence of sulphuretted-hydrogen gas, whereby a thin coat of sulphuret of lead is formed, which protects the matches against the influence of moisture, and which also improves the igniting power of the match. The matches so prepared will only ignite on a certain prepared surface, of which the principal base is one of the well-known sulphides or red or amorphous phosphorus. Said friction-surface may, for instance, be composed as follows: Water, three-fourths of one ounce; glue, three ounces; amorphous phosphorus, four and one-fourth ounces; black antimony, three ounces.

What I claim as new, and desire to secure by Letters Patent, is—

The within-described match compound, made of the ingredients above set forth, free from phosphorus and sulphur, substantially as specified.

The above specification of my invention signed by me this 19th day of August, 1865.

LOUIS LANSZWEERT.

Witnesses:
GEO. T. KNOX,
H. H. WELCH.